(12) United States Patent
Quintel et al.

(10) Patent No.: US 8,337,696 B2
(45) Date of Patent: Dec. 25, 2012

(54) METHOD FOR MAKING A BAG FILTER HOUSING

(75) Inventors: Mark Anthony Quintel, Kalamazoo, MI (US); Craig Lee Imanse, Schoolcraft, MI (US); Christopher Scott Rau, Battle Creek, MI (US)

(73) Assignee: Eaton Corporation, Cleveland, OH (US)

( * ) Notice: Subject to any disclaimer, the term of this patent is extended or adjusted under 35 U.S.C. 154(b) by 266 days.

(21) Appl. No.: 12/695,210

(22) Filed: Jan. 28, 2010

(65) Prior Publication Data

US 2011/0180471 A1    Jul. 28, 2011

(51) Int. Cl.
*B01D 35/30*    (2006.01)
*B01D 35/00*    (2006.01)

(52) U.S. Cl. ........ 210/232; 210/446; 210/448; 210/452; 72/69; 55/DIG. 5

(58) Field of Classification Search .................. 210/232, 210/448, 452, 446; 72/69; 55/DIG. 5
See application file for complete search history.

(56) References Cited

U.S. PATENT DOCUMENTS

| | | | |
|---|---|---|---|
| 2,960,951 A | 12/1955 | Bierman, Jr. | 113/52 |
| 3,109,400 A | 11/1963 | Paulton | 113/52 |
| 3,205,688 A | 9/1965 | Paulton | 72/82 |
| 4,953,376 A | 9/1990 | Merlone | 72/57 |
| 5,218,849 A | 6/1993 | Sieger et al. | 72/69 |
| 5,858,224 A * | 1/1999 | Schwandt et al. | 210/90 |
| 6,592,758 B2 | 7/2003 | Quintel | 210/232 |
| 2006/0086674 A1 * | 4/2006 | Morgan | 210/767 |

OTHER PUBLICATIONS

Serope Kalpakjian, "Manufacturing Processes for Engineering Materials" Copyright 1984, Reprinted with corrections, Jul. 1985 by Addison-Wesley Publishing Company Inc., pp. 442-449.
Manufacturing Processes for Engineering Materials, Serope Kalpakjian, Illinois Institute of Technology, 1984.

* cited by examiner

*Primary Examiner* — Nam Nguyen
*Assistant Examiner* — Madeline Gonzalez
(74) *Attorney, Agent, or Firm* — Daniel S. Kalka

(57) ABSTRACT

A spinning method for making a seamless filter housing 50 with an elliptical bottom 52 and a bottom opening 58 for a drain port. An inlet port 62 is added after fabrication along with any optional sensor ports 64. The seamless filter housing 50 made with this process.

18 Claims, 6 Drawing Sheets

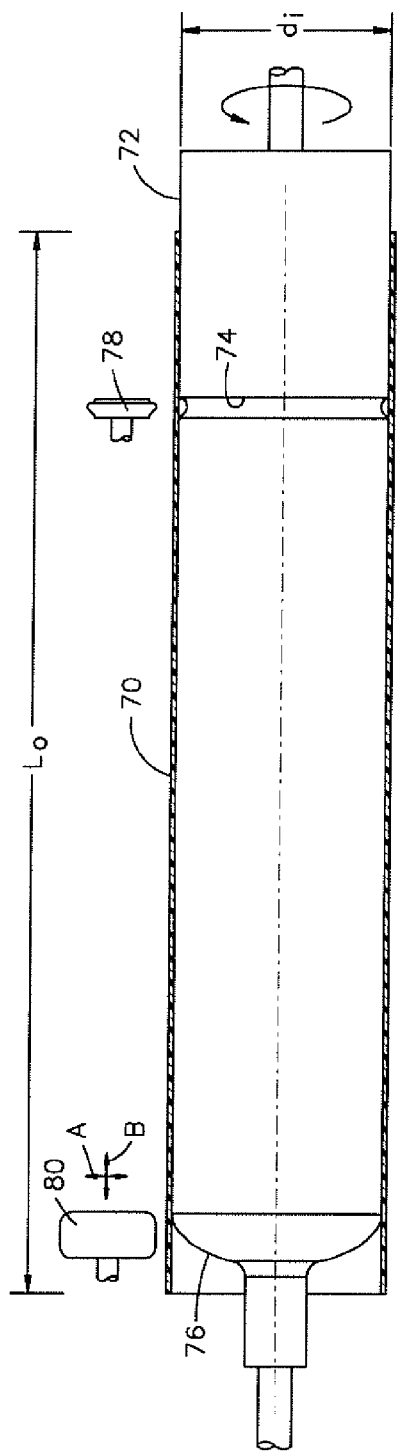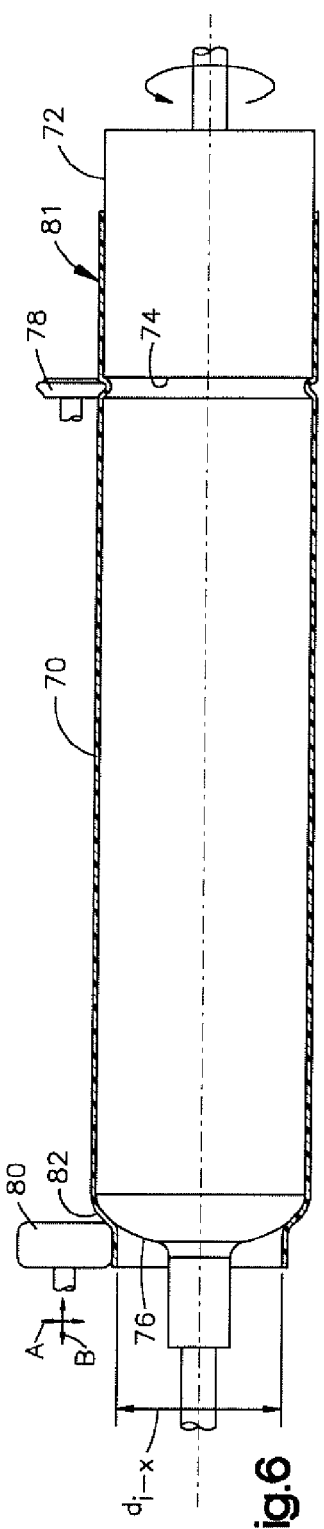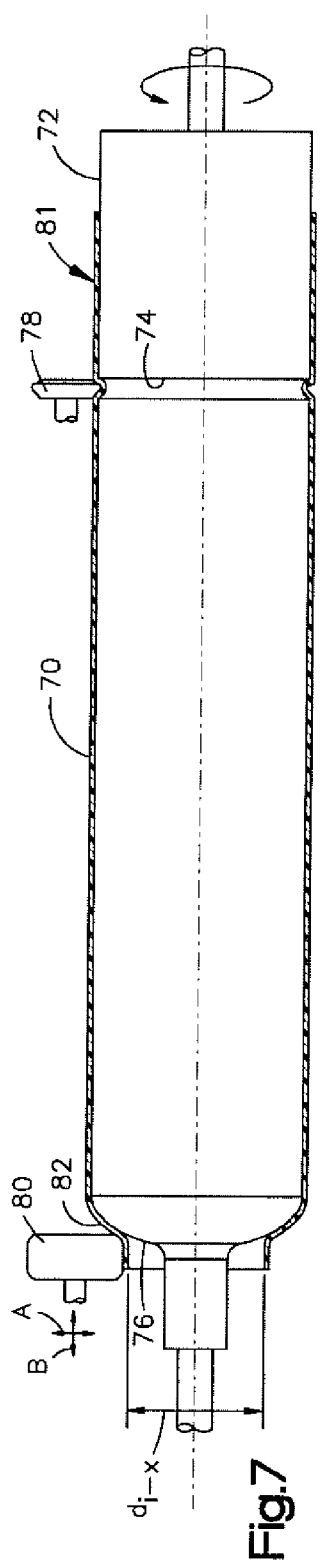

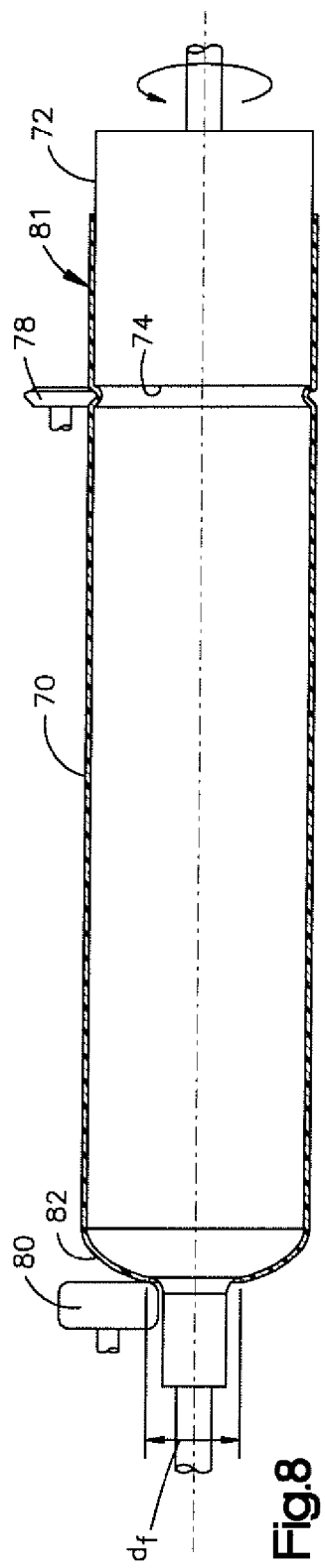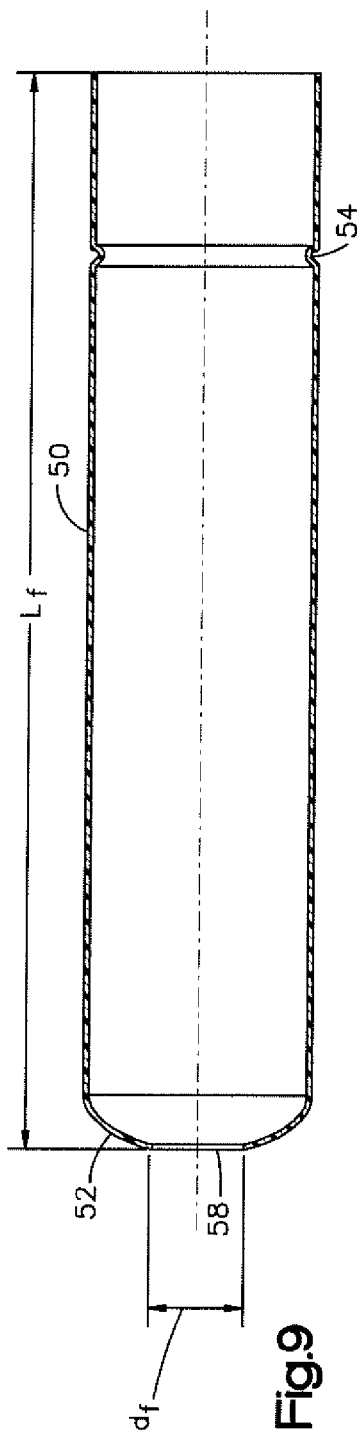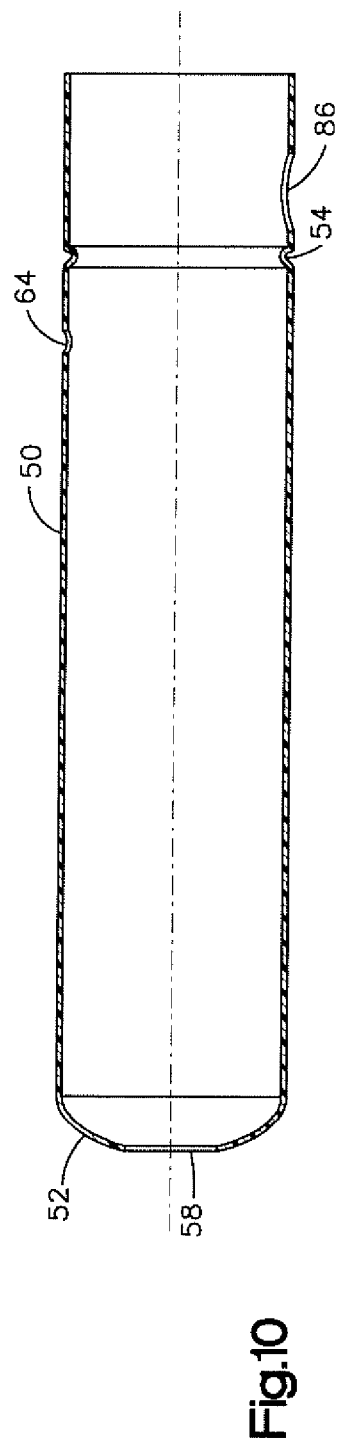

METHOD FOR MAKING A BAG FILTER HOUSING

BACKGROUND OF THE DISCLOSURE

The present disclosure relates generally to an improved bag filter housing, and more particularly to a method for making a seamless bag filter housing, and the seamless bag filter housing itself.

Many industrial and commercial facilities use filter assemblies to selectively remove material from liquid process streams. The filter assembly can be utilized for the purpose of either removing undesirable contaminants from the liquid process stream, or extracting desirable filtrates from the liquid process stream. An example of this type of filter assembly is a single bag filter housing typically used in industrial and commercial applications.

The single bag filter housing is constructed to hold a filter bag or cartridge within the housing and has an elliptical bottom shaped like a dome for drainage. The elliptical bottom which sometimes is referred to as the domed head has always been manufactured separately and attached to the housing with an annular weld. This type of construction requires significant cost in terms of time and effort in production. A welded seam is required that provides a smooth surface for easy cleaning plus a strong attachment.

Spinning processes for fabricating axisymmetric parts over a rotating mandrel are known in the art. There are three basic types of spinning processes: conventional (or manual), shear, and tube spinning.

To the inventor's knowledge no one has ever manufactured a seamless bag filter housing with an integral elliptical bottom notwithstanding the fact that spinning processes were known and used for a long period of time.

BRIEF SUMMARY OF THE DISCLOSURE

The present disclosure is directed to a spinning method for forming a seamless bag filter housing and the improved seamless bag filter housing made with the method of the subject disclosure.

A metal spinning process is employed with a rotating mandrel to form a tubular workpiece from an initial thickness ($T_o$) and length ($L_o$) to a seamless bag filter housing of a desired shape with a final thickness ($T_f$) and length ($L_f$) and having an elliptical bottom including bottom opening for a drain port. The seamless bag filter housing made in accordance with the method of the present disclosure provides significant advantages over the prior art methods in terms of cost, time, and effort in production.

The various features of novelty which characterize the invention are pointed out with particularity in the claims annexed to and forming a part of this disclosure. For a better understanding of the invention, its operating advantages, and specific objects attained by its uses, reference is made to the accompanying examples, drawings, and descriptive matter in which a preferred embodiment of the invention is illustrated.

BRIEF DESCRIPTION OF THE DRAWINGS

FIG. 5 is a sectional view illustrating a metal forming step employed with the method of the present disclosure depicting a tubular workpiece 70 on a rotating mandrel 72 with metal working tools 78, 80;

FIG. 6 is a view similar to FIG. 5 showing the metal working tools 78, 80 in progress shaping the annular groove 54 and end of the tubular workpiece;

FIG. 7 is a view similar to FIG. 6 illustrating the progression of the forming process;

FIG. 8 is a view similar to FIG. 7 illustrating further progression of the elliptical bottom on the tubular workpiece 70;

FIG. 9 is a sectional view of the filter housing 50 after the metal forming process showing the elliptical bottom 52 with the bottom opening 58 and the annular groove 54;

FIG. 10 is a view similar to FIG. 9 depicting the cut opening for the inlet port 62;

DETAILED DESCRIPTION OF THE INVENTION

Figure 2:
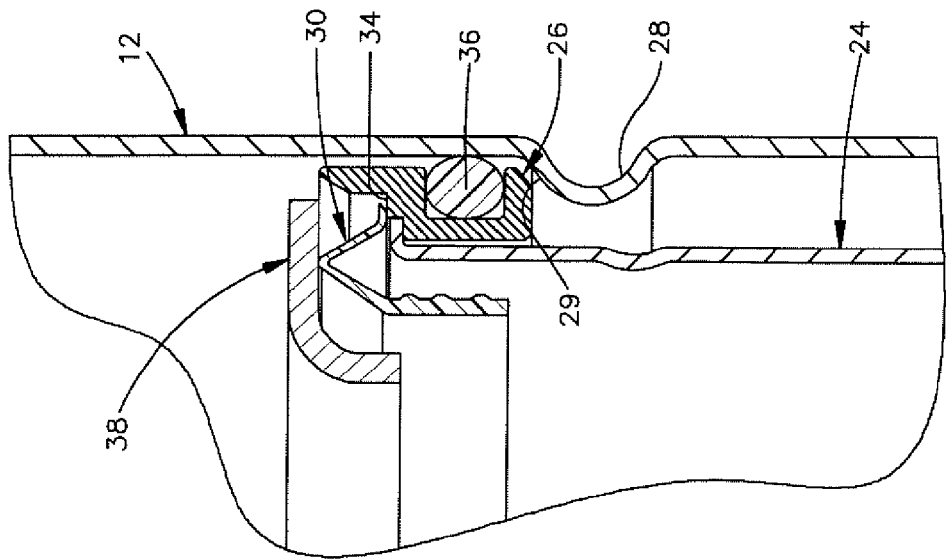
FIG. 2 is an enlarged partial sectional view of section 2-2 from FIG. 1.
Figure 1:
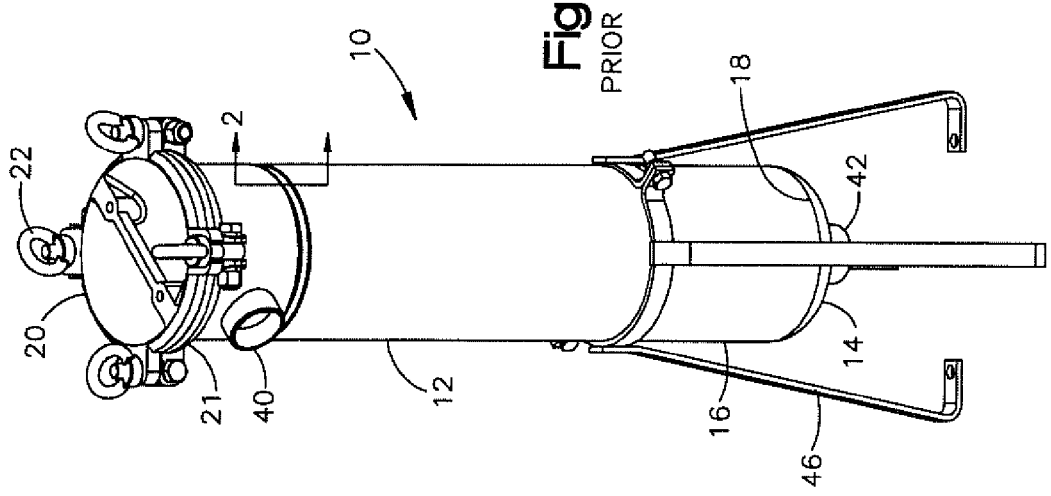
FIG. 1 is an elongated perspective view of a prior art filter assembly.

Referring to the figures where like numerals designate like or similar features throughout the several views, and first to FIG. 1, there is shown a known single bag filter assembly generally designated 10. Filter assembly 10 includes a main body or housing 12 with a domed head 14 attached at the lower end 16 of the filter housing 12. The domed head 14 is a separately cast or machined component that is welded as a separate piece to the filter housing 12 with an annular weld 18. Because of the material properties and thickness, the welding process required for annular weld 18 is costly in terms of time, effort, and material. The manufacturing process for fabricating the filter housing 12 is slow and technique intensive.

Filter assembly 10 includes a hingedly connected, releasable cover 20 secured with a plurality of toggle bolts 22. Cover 20 is secured to the filter housing 12 with a clamping arrangement 21.

Filter assembly 10 includes a restrainer basket 24 disposed within filter housing 12. Restrainer basket 24 is held in position within the housing 12 by an adapter plate 26 resting upon an edge 29 of an annular groove 28 formed in the housing 12. A bag ring 30 attached to a filter bag (not shown) rests on a shoulder 34 of the adapter plate 26 to hold the filter bag 32 within the restrainer basket 24. A resilient o-ring 36 provides a fluid sealing engagement between the adapter plate 26 and the interior of housing 12. A hold down lid 38 placed over the bag ring 30 holds the filter bag 32 in place within basket 24.

Figures 3, 4:
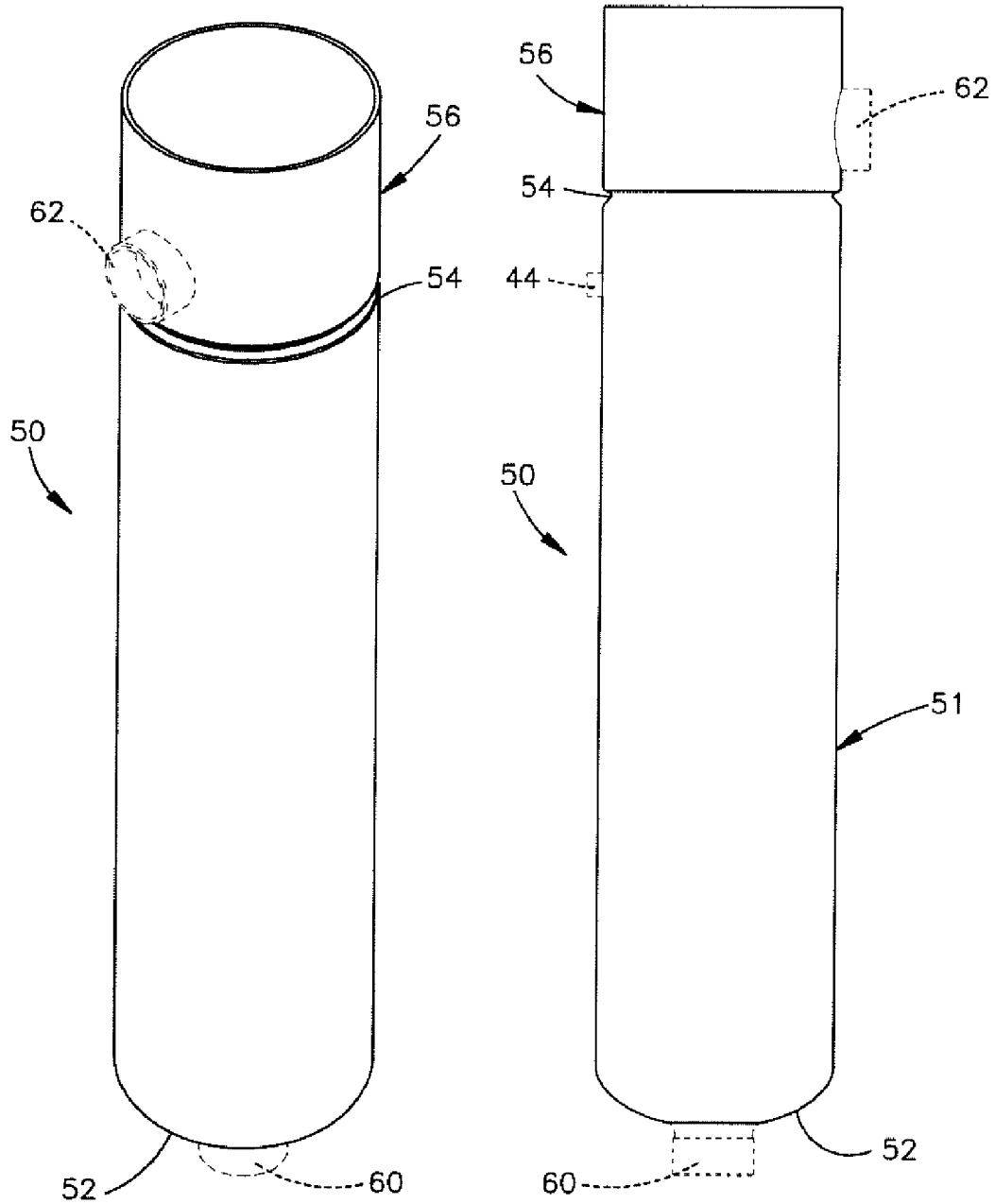
FIG. 3 is an elevated perspective view of a filter housing 50 made in accordance with method of the present disclosure.
FIG. 4 is a side view of the filter housing 50 shown in FIG. 3.

The filter housing 12 contains at least two ports, an inlet port 40 and a drain port 42. One or more additional apertures 44, as seen in FIG. 4, may be provided for a sensor for measuring pressure, temperature, or any other desired process conditions. Optional legs 46 can be employed to support the filter assembly 10.

Turning now to FIGS. 3 and 4, there is shown the improved seamless bag filter housing 50 made in accordance with the metal forming method of the present disclosure. Filter housing 50 includes an elliptical bottom 52, also referred to occasionally herein as a domed head, and an annular groove 54 situated in an upper region or end 56. Annular groove 54 functionally divides filter housing 50 with the upper region 56 where a liquid process stream enters the housing 50 and a lower region 57 where the filtration process occurs. An opening 58 best seen in FIGS. 9 and 10 is provided fairly centrally in the elliptical bottom 52 for receiving a drain or exit port 60 shown in dashed lines. An inlet port 62 shown in dashed lines is provided after the filter housing 50 has been formed as is described later in more detail. Optional sensor ports, like pressure sensor port 64, may be added to the filter housing 50.

Referring now to FIGS. 5 through 8, the metal forming method according to the present disclosure is illustrated and described in greater detail. A tubular workpiece 70 with an initial length ($L_o$) and initial thickness ($T_o$) is positioned on a rotatable cylindrical mandrel 72. Mandrel 72 is sized to substantially conform with the internal diameter (di) of the tubular workpiece 70 which will become the desired internal diameter of the finished filter housing 50. Mandrel 72 includes an annular indentation 74 used in forming the annular groove 54. Mandrel 74 in one embodiment may contain a curved end 76 to facilitate formation of the elliptical bottom 52 of filter housing 50. Mandrel 72 optionally may include a system for heating the mandrel 72, for example, inductively with heating wires or conductively passing hot air through the mandrel 72. The tubular workpiece (70) is first heated to a temperature in the range between approximately 1200 to 1800 degrees F. prior to engagement of the metal working tools 78, 80.

Mandrel 72 with tubular workpiece 70 thereon rotatably spins with the use of a motor (not shown) during this metal forming process (also referred to herein as a spinning process). A first angular working tool 78 with an exertion of sufficient force bends the annular groove 54 in a desired width, depth, and shape in an upper region 81 of the tubular workpiece 70 as seen in FIG. 6. The angular metal forming tool 78 in one embodiment has the ability to roll as pressure is exerted on the tubular workpiece 70. In another embodiment, the angular metal working or forming tool 78 may be in a fixed position as it presses down on the tubular workpiece. Groove 54 in still another embodiment is added later with a separate tool 78 and mandrel 72 can be removed during this process.

Another metal working or forming tool 80, which may include a rolling tool, disposed at the lower end 82 of the tubular workpiece 70 operates with the curved end 76 of mandrel 72 to apply a sufficient force to bend the lower end 82 of tubular workpiece 70 in a manner that gradually reduces the diameter ($d_{i-x}$), where x represents an increasing value proportional to the necking down of the opening 84 at the lower end 82 of the workpiece 70 as depicted in FIGS. 6 through 8. The force applied to the metal forming tools 78, 80 can be a hydraulic or mechanical pressing force. The arrows, A and B, indicate the movement of the working tool 80 in both the vertical and horizontal directions. While two separate metal working tools 78, 80 are shown in this embodiment, it should be immediately apparent that one metal working tool within interchangeable tool heads may be employed.

Once the metal spinning process is complete, the thickness of tubular workpiece 70, ($T_o$) is now ($T_f$) and the length ($L_o$) is now ($L_f$). As should be immediately appreciated, the length ($L_f$) is the desired or intended length of the filter housing 50. The thickness ($T_f$) is the desired or intended thickness of the filter housing 50 and the diameter ($d_f$) is the desired or intended diameter of the bottom opening 58 in the filter housing 50.

The tubular workpiece after undergoing the metal spinning process in accordance with the present disclosure has a shape or form as shown by the sectional view in FIG. 9 which is the now formed seamless filter housing 50. The bottom opening 58 in the elliptical bottom 52 allows for installation of a drain port or drain nozzle 60. In FIG. 10, an opening 86 is provided for installation of an inlet port or inlet nozzle 62, for example a pipe connection. Additional openings may be provided as desired, for example, a pressure sensor port 64 as seen in FIG. 4.

Figure 11:
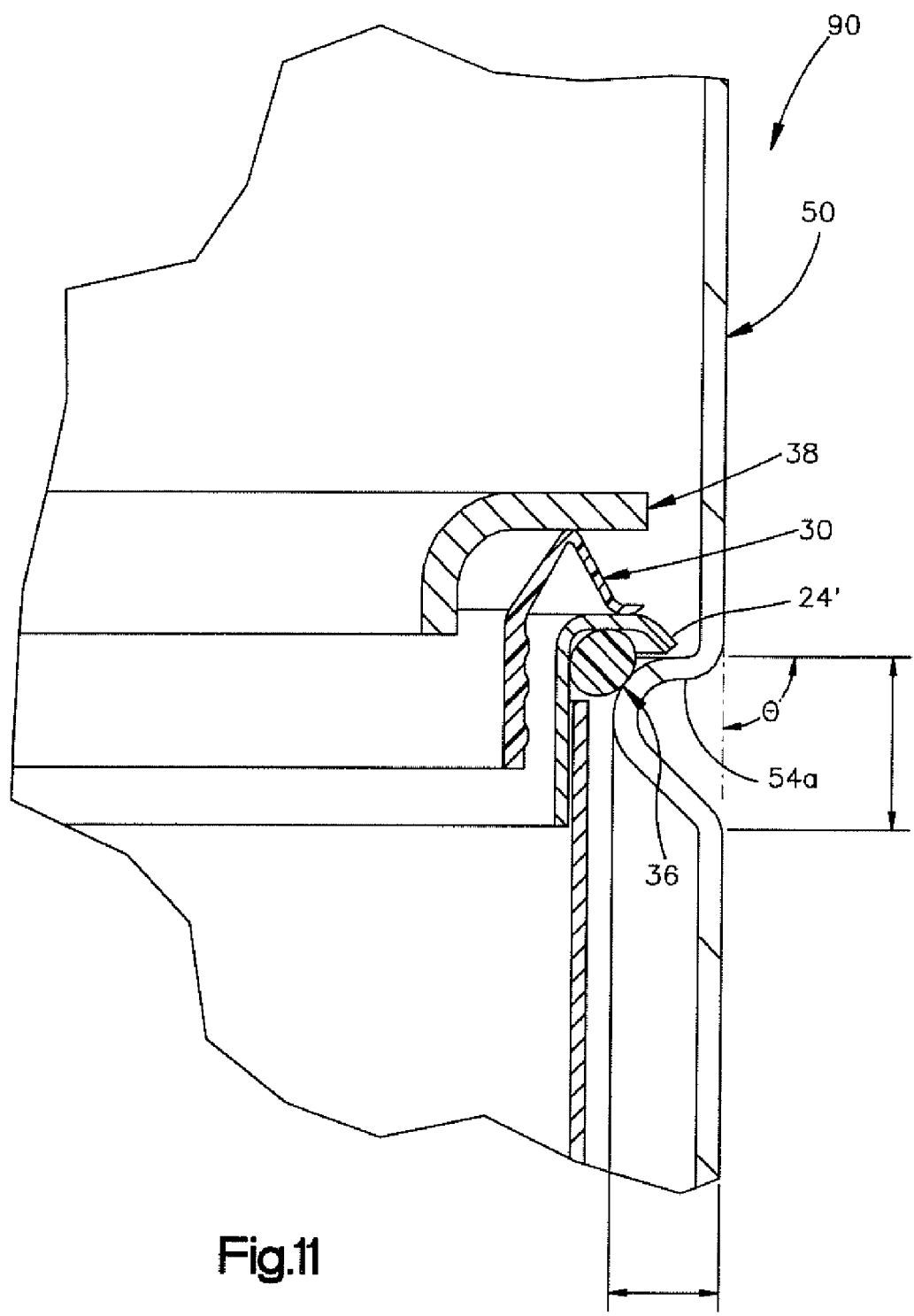
FIG. 11 is an enlarged partial sectional view similar to FIG. 2 showing a filter assembly construction with the seamless filter housing 50.

Referring now to FIG. 11, there is shown in an enlarged partial sectional view still another advantage of the method of the present disclosure and the seamless bag filter housing formed with this method. The adapter plate 26 is no longer required with a filter assembly 90 utilizing the seamless bag filter housing 50. The annular groove 54 is formed with a ledge 54a having an angle ($\Theta$) shaped to directly hold the restrainer basket 24 in place. Angle ($\Theta$) is approximately a 90 degree angle. Ledge 54a only needs to have an angular degree that can effectively hold restrainer basket 24 in place within filter housing 50.

The width (w) and depth ($d_g$) of annular groove 54 is formed to accommodate the size of the restrainer basket 24 and filter bag or filter cartridge (not shown) intended for use in the filter assembly 90.

Figure 12:
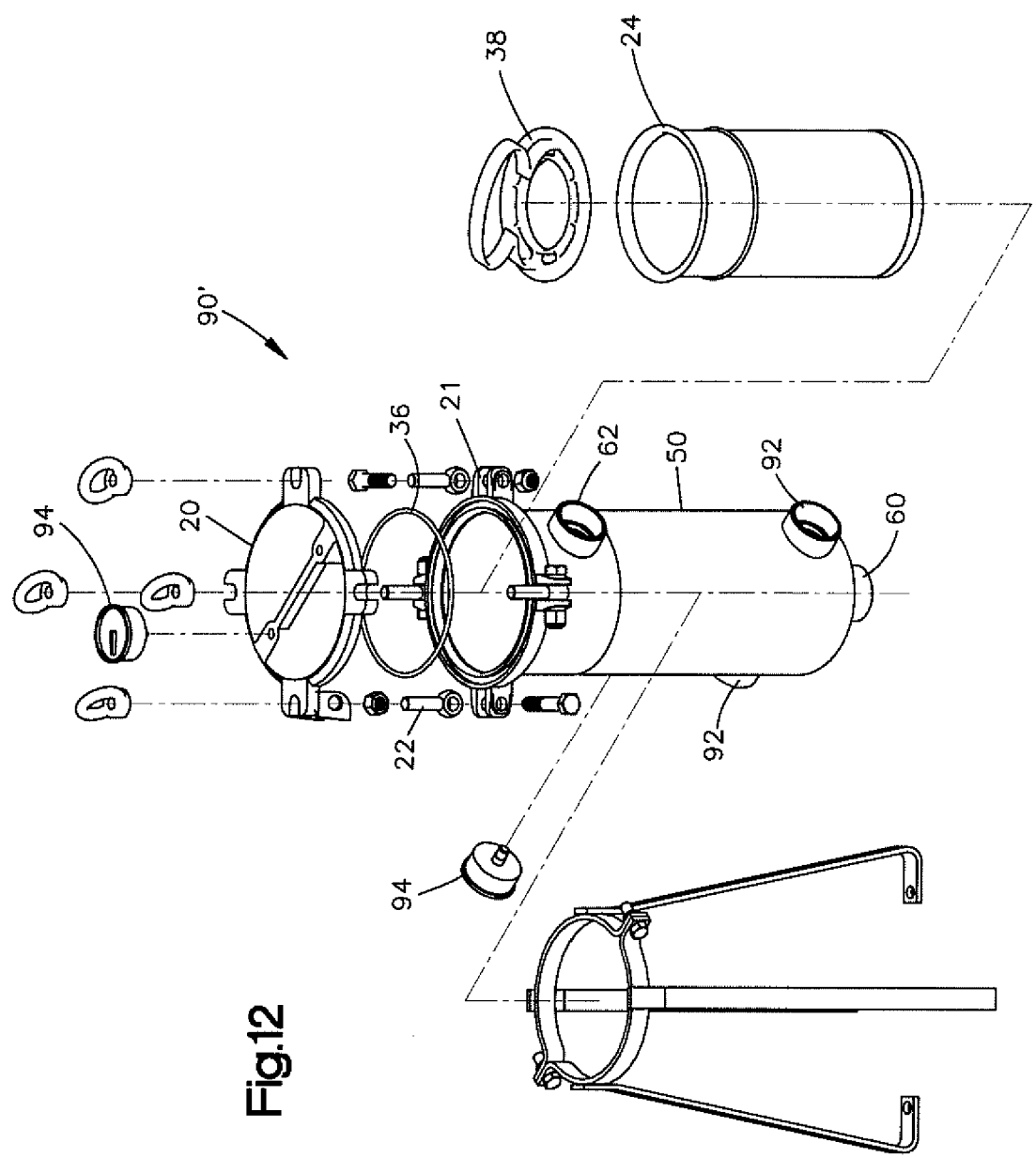
FIG. 12 is an exploded view of a filter assembly with yet another embodiment of filter housing 50.

FIG. 12 depicts in an exploded view another embodiment of a filter assembly 90' with a filter housing 50 made with the spinning process for the present disclosure. In this embodiment, an additional exit port 92, shown in two possible locations, is provided in the filter housing 50. As mentioned previously, additional openings may be cut or drilled into filter housing 50 to accommodate additional functional ports. Pressure gauges or sensors 94 are located in the housing 50 and the cover 20. Cover 20 is securely attached to the seamless bag filter housing 50 with a clamping arrangement 21. In alternate embodiments, the seamless filter housing may be formed with a rim or flange (not shown) at the open end opposite the elliptical end for securing a cover.

The filter housing 50 constructed with the method of the present disclosure provides the advantages of a significantly low cost, seamless filter housing. The cover 20, restrainer basket 24, and other components of the existing filter assembly 10 can be interchangeably used with the filter housing 50 provided the filter housing is sized accordingly.

The method of the present disclosure is applicable to the fabrication of filter housings with different lengths, widths, and diameters as well as thickness of materials. Suitable materials include but are not limited to carbon steel, Types 304 or 316 stainless steel for higher corrosion resistance.

While specific embodiments of the invention have been shown and described in detail to illustrate the application of the principles of the invention, it will be understood that the invention may be embodied otherwise without departing from such principles.

We claim:

1. A method for forming a filter housing, comprising the steps of:
   providing a tubular workpiece with a predetermined thickness ($T_o$), length ($L_o$), and diameter($d_i$);
   positioning the tubular workpiece on a cylindrical mandrel;
   heating the tubular workpiece to a temperature between approximately 1200 and 1800 degrees Fahrenheit;
   rotating the heated tubular workpiece;
   forming an annular groove with a desired depth, width, and shape in an upper region of the tubular workpiece with a metal working tool; and
   shaping an elliptical bottom with a bottom opening for a drain at one end of the tubular workpiece to form a seamless filter housing.

2. A method as recited in claim 1, further comprising the step of shaping the tubular workpiece from the predetermined thickness ($T_o$) and length ($L_o$) to a selected thickness ($T_f$) and length ($L_f$).

3. A method as recited in claim 1, wherein the tubular workpiece is a carbon steel.

4. A method as recited in claim 1, wherein the tubular workpiece is a stainless steel.

5. A method as recited in claim 1, further comprising the step of providing an opening for an inlet port in the upper region of the seamless filter housing.

6. A method as recited in claim 1, further comprising the step of providing an additional opening for a pressure sensor in a lower region of the seamless filter housing.

7. A method for forming a filter housing, comprising the steps of:
- providing a tubular workpiece with a predetermined thickness ($T_o$), length ($L_o$), and diameter ($d_i$);
- positioning the tubular workpiece on a cylindrical mandrel;
- heating the tubular workpiece to a temperature between approximately 1200 and 1800 degrees Fahrenheit;
- rotating the heated tubular workpiece;
- forming an annular groove with a desired depth, width, and shape in an upper region of the tubular workpiece with a first metal working tool; and
- shaping an elliptical bottom with a second metal working tool and providing a bottom opening for a drain at one end of the tubular workpiece to form a seamless filter housing, wherein the tubular workpiece is shaped from the predetermined thickness ($T_o$) and length ($L_0$) to a selected thickness ($T_f$) and length ($L_f$) with the bottom opening having a diameter ($d_f$).

8. A method as recited in claim 7, wherein the tubular workpiece is a carbon steel.

9. A method as recited in claim 7, wherein the tubular workpiece is a stainless steel.

10. A method as recited in claim 7, further comprising the step of providing an opening for an inlet port in the upper region of the seamless filter housing.

11. A method as recited in claim 7, further comprising the step of providing an additional opening for a pressure sensor in a lower region of the seamless filter housing.

12. A method as recited in claim 7, wherein the annular groove is formed with a ledge constructed to hold a restrainer basket.

13. A method as recited in claim 7, wherein the cylindrical mandrel further includes an annular indentation used in forming the annular groove.

14. A method as recited in claim 7, wherein the annular groove has a width (w) and a depth ($d_g$) formed to accommodate a restrainer basket.

15. A method as recited in claim 7, wherein the annular groove has a width (w) and a depth ($d_g$) formed to accommodate a filter cartridge.

16. A method as recited in claim 7, wherein the annular groove has a width (w) and depth ($d_g$) formed to accommodate a filter bag.

17. A method as recited in claim 7, further comprising the step of providing an exit port in the filter housing.

18. A method as recited in claim 9, wherein the stainless steel is a member selected from the group consisting of Type 304 and Type 316 stainless steel material.

\* \* \* \* \*